Patented July 10, 1928.

1,676,309

UNITED STATES PATENT OFFICE.

JOHN H. WRIGHT, OF LARCHMONT, NEW YORK, ASSIGNOR TO ZONITE PRODUCTS COMPANY, OF NEW YORK, N. Y., A CORPORATION OF DELAWARE.

ANTISEPTIC PREPARATION.

No Drawing.   Application filed February 19, 1926.   Serial No. 89,291.

This invention relates to antiseptic preparations and is herein disclosed as embodied in a chlorine-yielding ointment free from glycerides and other substances which cause deterioration of the chlorine-yielding ingredient, and yet containing, if desired, an aromatic substance which will produce an agreeable odor.

Preparations such as ointments containing available chlorine which have hitherto been prepared have been of such composition that the ointment deteriorated rapidly with the result that the ointment was of too uncertain strength to safely sell at retail.

Most of the substances ordinarily used as "aromatics", that is as perfumes, or to give a pleasant aroma to ointments, and to other toilet and medicinal preparations, are unsuitable for use in chlorine-yielding preparations since they react more or less rapidly with the chlorine-yielding ingredient. As a result the latter are destroyed or even may be converted to malodorous substances. Deterioration has been due to several causes, one being the reaction of the chlorine-containing material with these aromatic constituents of the ointment, another being its reaction with the glycerides.

These and other objections have been overcome. It has been found that menthol, bornyl acetate, and a number of the other esters of the saturated fatty acids remain stable in the presence of salts of chlor-sulphon-amid-acids, and in the presence of any of a number of other organic chlorine-yielding compounds. Moreover eucalyptol reacts only slightly with such compounds, and if suitably chlorinated ceases to be reactive, and is not them malodorous. Eucalyptol can therefore be used as an ingredient where a proper excess of the chlorine-yielding material is used. The aliphatic saturated fatty acid esters are generally increasingly stable with increasing molecular weight when used with such chlorine-yielding compounds. Any or several of these aromatic substances may be used.

Moreover the objection arising from the reactivity of glycerides has overcome in ointments by substituting for the glycerides or other grease an emollient ingredient consisting of a special fatty acid soap carrying a considerable excess of fatty acid. The fatty acid will not absorb or cause deterioration of the chlorine content of the chlorine-yielding material if it is a saturated fatty acid, so, for commercial work, it is preferable to employ stearic acid. In the presence of a suitable amount of water the stearic acid, partly saponified, provides a suitable emollient base for the ointment. To obtain the best consistency it is preferable to partly saponify the stearic acid with caustic potash.

A number of chlorine-yielding organic compounds have proved useful, and such, in general, are the chlor-sulphon-amid compounds. To avoid the use of glycerides and be satisfactory in connection with the above described fatty-acid soap, the chlorine-yielding compound should preferably be water-soluble. Commercially the ortho and para compounds are most available. Of the ortho compounds the water-soluble one, least irritating to the skin, yet relatively stable, so far found is the sodium salt of the ortho-di-chlor-sulphon-amid of benzoic acid, i. e. $SO_2NCl_2C_6H_4COONa$.

This is eminently satisfactory in the absence of excess alkali, as stable, non-irritating, and having a relatively large content of available chlorine.

A satisfactory ointment was made by dissolving one and one-fourth pounds of potassium hydroxide in seventy-five pounds of water in the jacketed kettle of a Read mixer and heating to 85° C. The beater was started and fifteen pounds of melted stearic acid at 85° C. were slowly poured in and the agitation continued until the mixture was smooth and began to cream. The steam was then cut off from the jacket and cold water introduced to cool the mixture rapidly. When below 50° C. there was added rather less than 1½% of the sodium salt of the otho-di-chlor-sulphon-amid of benzoic acid, so that the final product contained two and one-half to three grams of available chlorine per kilogram. When the cooling had reached below 40° C. there was added one and one-fourth per cent eucalyptol, four-tenths of one per cent of bornyl acetate, and one-fifth of one per cent of menthol. The mixing was continued and when thoroughly mixed the ointment was finished and ready to pack in the usual collapsible metal tubes.

This composition contains an available reserve of normally inactive alkali in the potassium stearate which tends to hydrolyze in solution, but, in this ointment, is prevented from so doing by the excess stearic acid.

The ointment contains an available reserve of acid which is normally inactive because it is very slightly soluble,—the stearic acid being soluble in the water to the extent of a fraction of one per cent.

Having thus described certain embodiments of my invention, what I claim is:

1. A stable preparation including water, a chlorine-yielding substance, a stearate, and a substantial excess of stearic acid.

2. A stable preparation including water, a chlorine-yielding substance, an aromatic substance inert with respect to the chlorine-yielding substance, and carrying a substantial excess of free stearic acid.

3. A stable preparation including water, a chlorine-yielding substance, a salt of a saturated fatty acid, an excess of a fatty acid which is nearly insoluble in water, and an aromatic substance inert with respect to the chlorine-yielding substance.

4. A stable ointment including a salt of a chlor-sulphon-amid acid, a salt of a saturated fatty acid, an excess of a saturated fatty acid, and an aromatic substance inert with respect to the sulphon amid acid.

5. A stable ointment including a salt of a chlor-sulphon-amid benzoic acid, a stearate of an alkali metal, an excess of stearic acid, and eucalyptol.

6. A stable ointment consisting of the sodium salt of the ortho-dichlor-sulphon-amid of benzoic acid, potassium stearate, free stearic acid, water, eucalyptol, bornyl acetate, and menthol.

7. A stable ointment including water, an organic chlorine-yielding substance, a stearate, and a substantial excess of free stearic acid.

8. A stable ointment including water, an organic chlorine-yielding substance, an aromatic substance inert with respect to the chlorine-yielding substance, and carrying a substantial excess of free stearic acid.

9. A stable ointment including water, an organic chlorine-yielding substance, a salt of a saturated fatty acid, an excess of a fatty acid which is nearly insoluble in water, and an aromatic substance inert with respect to the chlorine-yielding substance.

10. A substantially stable chlorine composition of the character described comprising an active chlorine-yielding material and cineol in a form adapted to mask the chlorine odor thereof.

11. A substantially stable chlorine composition of the character described comprising a major portion of an active chlorine material and a minor portion of cineol substantially free from modifying constituents but in an amount sufficient to mask the chlorine odor thereof.

In testimony whereof, I have signed my name to this specification.

JOHN H. WRIGHT.